US011645997B2

(12) United States Patent
Shi et al.

(10) Patent No.: US 11,645,997 B2
(45) Date of Patent: May 9, 2023

(54) INFORMATION PROCESSING METHOD AND ELECTRONIC DEVICE

(71) Applicant: Lenovo (Beijing) Limited, Beijing (CN)

(72) Inventors: Jun Shi, Beijing (CN); Fangxing Liu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/681,116

(22) Filed: Feb. 25, 2022

(65) Prior Publication Data

US 2023/0091508 A1 Mar. 23, 2023

(30) Foreign Application Priority Data

Sep. 22, 2021 (CN) .......................... 202111106069.9

(51) Int. Cl.
*G09G 5/00* (2006.01)
*G06F 3/0485* (2022.01)
*G06F 3/04847* (2022.01)
*G06F 3/04855* (2022.01)
*G06F 3/04845* (2022.01)
*G06F 3/04842* (2022.01)
*G06F 3/04886* (2022.01)

(52) U.S. Cl.
CPC ........... *G09G 5/005* (2013.01); *G06F 3/0485* (2013.01); *G06F 3/04842* (2013.01); *G06F 3/04845* (2013.01); *G06F 3/04847* (2013.01); *G06F 3/04855* (2013.01); *G06F 3/04886* (2013.01); *G09G 2340/0435* (2013.01); *G09G 2354/00* (2013.01)

(58) Field of Classification Search
CPC ........... G09G 5/005; G09G 2340/0435; G09G 2354/00; G06F 3/04842; G06F 3/04847
See application file for complete search history.

(56) References Cited

U.S. PATENT DOCUMENTS

| | | | |
|---|---|---|---|
| 7,673,252 B2 * | 3/2010 | Chen ...................... | G06F 3/0238 345/173 |
| 10,839,572 B2 * | 11/2020 | Church ............... | G06F 3/04815 |
| 2004/0066412 A1 * | 4/2004 | Becker ................. | G06F 3/0481 715/781 |
| 2013/0159874 A1 * | 6/2013 | Bhogal ................. | G06F 3/0484 715/733 |
| 2017/0083232 A1 * | 3/2017 | Helmes ............... | G06F 3/04842 |

* cited by examiner

*Primary Examiner* — Gene W Lee
(74) *Attorney, Agent, or Firm* — Anova Law Group, PLLC

(57) ABSTRACT

An information processing method. The information processing method includes obtaining an input operation, the input operation being used to activate an input interface; and activating the input interface and displaying the input interface in an output area of a display screen based on a refresh rate corresponding to the input interface in response to the input operation.

14 Claims, 11 Drawing Sheets

(a)

(b)

(a)

(b)

INFORMATION PROCESSING METHOD AND ELECTRONIC DEVICE

CROSS-REFERENCES TO RELATED APPLICATION

This application claims priority to Chinese Patent Application No. 202111106069.9, filed on Sep. 22, 2021, the entire content of which is incorporated herein by reference.

FIELD OF TECHNOLOGY

The present disclosure relates to the field of control and, more specifically, to an information processing method and an electronic device.

BACKGROUND

A light-emitting diode (LED) display is composed of LED dot matrix, which displays the content through the on and off of red, blue, and yellow light bulbs.

In conventional technology, the refresh rate of a screen is for the entire surface. When the refresh rate is switched, the entire surface is switched, which leads to high refresh power consumption.

BRIEF SUMMARY OF THE DISCLOSURE

One aspect of the present disclosure provides an information processing method. The information processing method includes obtaining an input operation, the input operation being used to activate an input interface; and activating the input interface and displaying the input interface in an output area of a display screen based on a refresh rate corresponding to the input interface in response to the input operation.

Another aspect of the present disclosure provides an electronic device. The electronic device includes a display screen and a processor. The processor is configured to obtain an input operation, the input operation being used to activate an input interface; and activate the input interface and display the input interface in an output area of the display screen based on a refresh rate corresponding to the input interface in response to the input operation.

Another aspect of the present disclosure provides a non-transitory computer-readable storage medium containing computer-executable instructions for, when executed by one or more processors, performing an information processing method. The method includes obtaining an input operation, the input operation being used to activate an input interface; and activating the input interface and displaying the input interface in an output area of a display screen based on a refresh rate corresponding to the input interface in response to the input operation.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Figure 1:
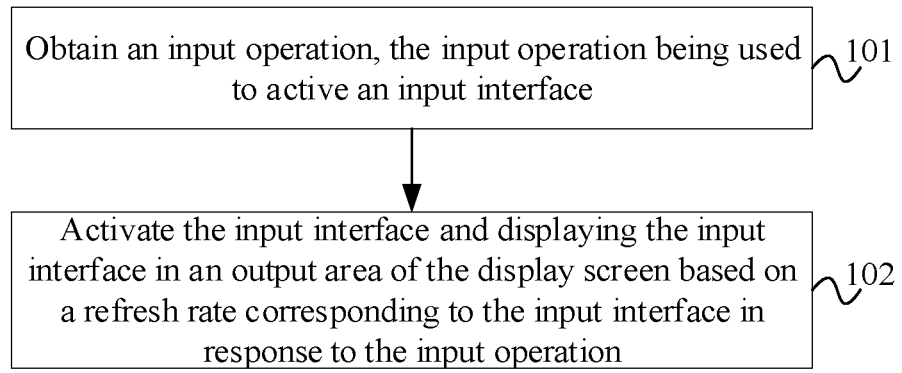
FIG. 1 is a flowchart of an information processing method according to an embodiment of the present disclosure.

FIG. 1 is a flowchart of an information processing method according to an embodiment of the present disclosure. The method can be applied to an electronic device. The method will be described in detail below.

101, obtaining an input operation, the input operation being used to active an input interface.

In some embodiments, the electronic device may include a display screen, and the content may be displayed on the display screen.

In some embodiments, the input interface may be an interface involved in input, and the input may be various types of input, such as a sliding input, a clicking input, etc.

Specifically, the input operation may be performed on a touch screen disposed overlappingly the display screen, or the input operation may be performed by an external input structure such as a mouse and a touch pad.

102, activating the input interface and displaying the input interface in an output area of the display screen based on a refresh rate corresponding to the input interface in response to the input operation.

In some embodiments, in response to the input operation, the input interface may be activated.

In some embodiments, when the input interface is displayed in the output area of the display screen, the refresh rate of the entire display screen may be reduced, or the refresh rate of the output area controlling the input interface ma be different from the refresh rate of other areas in the display screen. For example, the refresh rate of controlling the output area may be lower than the refresh rate of other areas, or the refresh rate of controlling the output area may be higher than the refresh rate of other areas.

An embodiment of the present disclosure provides an information processing method. The method includes obtaining an input operation, the input operation being used to activate an input interface; in response to the input operation, activating the input interface and displaying the input interface in an output area of the display screen based on a refresh rate corresponding to the input interface. In this technical solution, after the input interface is activated, the input interface can be displayed at a different refresh rate from other areas in the display screen, such that different areas of the display screen can use different refresh rates. Compared with using the same refresh rate for the entire surface, the refresh power consumption of the screen is reduced.

Figure 2:
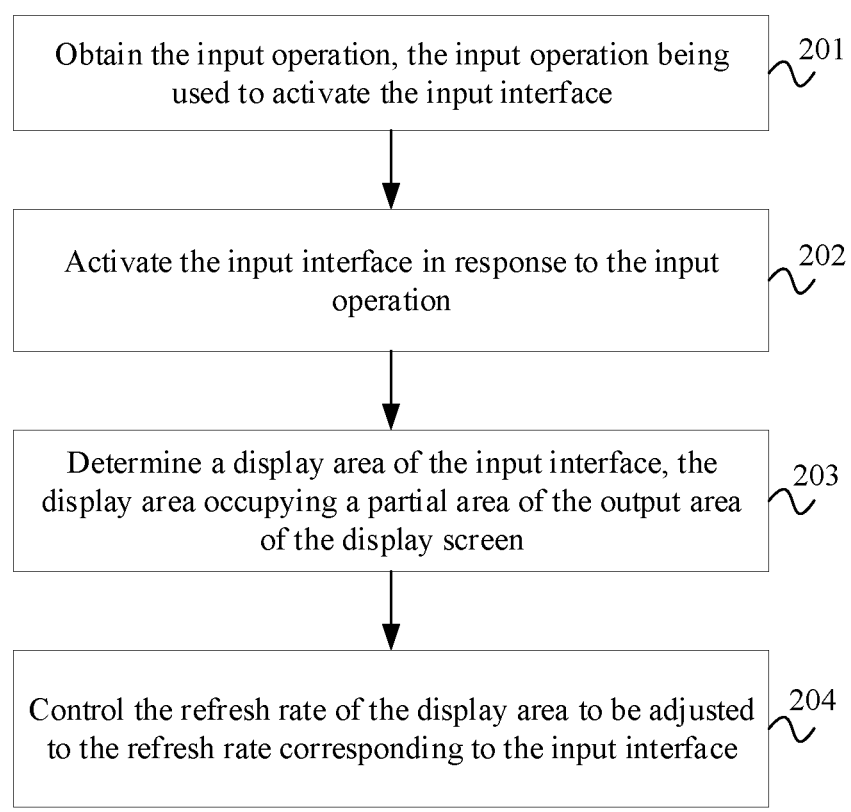
FIG. 2 is a flowchart of the information processing method according to an embodiment of the present disclosure.

FIG. 2 is a flowchart of the information processing method according to an embodiment of the present disclosure. The method will be described in detail below.

201, obtaining the input operation, the input operation being used to activate the input interface.

The process at 201 is the same as the process at 101, which will not be repeated here.

202, activating the input interface in response to the input operation.

203, determining a display area of the input interface, the display area occupying a partial area of the output area of the display screen.

In some embodiments, the display area of the input interface ma be a pre-agreed area.

In a specific implementation, different input interfaces may correspond to different display areas in the display screen.

For example, the input interface may be an interface used to respond to input instructions. Based on the user's input operation, the input interface may respond to display the content corresponding to the input operation, and the input interface may be displayed in any display area on the display screen.

In some embodiments, an input interface may be displayed on a specific display area on the display screen, or the input interface may be adjusted based on the actual situation.

It should be noted that there may be one or more display areas corresponding to the input interface in the display screen.

204, controlling the refresh rate of the display area to be adjusted to the refresh rate corresponding to the input interface.

In some embodiments, the refresh rate may be preset for the input interface. Since the content of the input interface may change slightly, the display area may be refreshed at a lower refresh rate, which is generally lower than the default refresh rate of the display screen.

In some embodiments, the refresh rate of the display area of the input interface in the display screen may be controlled to be adjusted to the refresh rate corresponding to the input interface. Other areas in the display screen may not be adjusted or adjusted to the refresh rate of other settings, and the refresh rate of the other settings may be different from the refresh rate of the display screen of the input interface.

An embodiment of the present disclosure provides an information processing method where the input interface can be displayed in an output area of a display screen based on a refresh rate corresponding to the input interface. The method includes determining a display area of the input interface, the display area occupying a partial area of the output area of the display screen; and controlling the refresh rate of the display area to be adjusted to the refresh rate corresponding to the input interface. In this technical solution, after determining the display area occupied by the input interface on the display screen, the refresh rate of the display area can be adjusted based on the refresh rate corresponding to the input interface, such that the refresh rate of the display area corresponding to the input interface can be different from other areas in the display screen.

Figure 3:
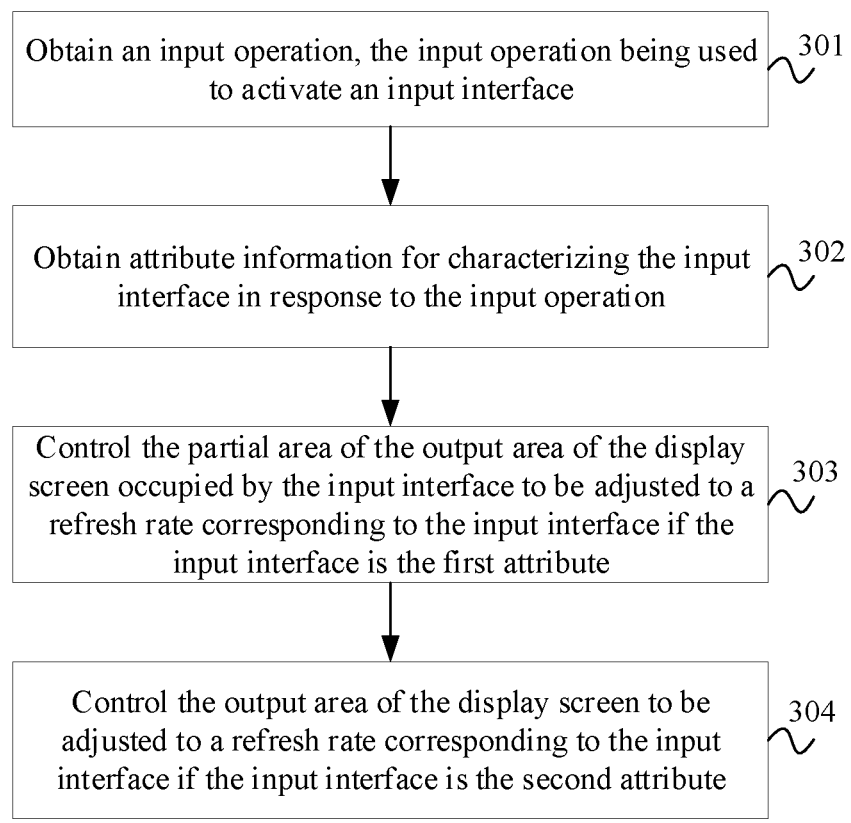
FIG. 3 is a flowchart of the information processing method according to an embodiment of the present disclosure.

FIG. 3 is a flowchart of the information processing method according to an embodiment of the present disclosure. The method will be described in detail below.

301, obtaining an input operation, the input operation being used to activate an input interface.

The process at 301 is the same as the process at 101, which will not be repeated here.

302, obtaining attribute information for characterizing the input interface in response to the input operation.

In some embodiments, the attribute information may be information for distinguishing the input interface, and the attribute information may be related to the level of attention of the input interface.

More specifically, the attribute information may include a first attribute and a second attribute, and the levels of user attention corresponding to the first attribute and the second attribute may be different.

For example, the level of user attention corresponding to the first attribute may be lower than the level of user attention corresponding to the second attribute.

It should be noted that when the input interface is activated, since the content of the input interface changes slightly, the refresh rate of the display area corresponding to the input interface may be set to be lower than the refresh rate of other areas in the display screen. The attribute information may be related to the user's attention. The input interface with high user attention may use a relatively high refresh rate, while the input interface with lower user attention may use a relatively low refresh rate.

For example, after the input interface is activated and displayed, the user may pay more attention to the input interface. Since the changes in the input interface are limited, a lower refresh rate may be used for the display area corresponding to the input interface, which may be slightly lower than the refresh rate of other areas. Further, when the user pays more attention to other areas in the display screen except the display area corresponding to the input interface, a lower refresh rate may be used for the display area corresponding to the input interface.

303, controlling the partial area of the output area of the display screen occupied by the input interface to be adjusted to a refresh rate corresponding to the input interface if the input interface is the first attribute.

In some embodiments, the input interface being the first attribute may indicate that the input interface is being used to obtain a sliding operation to continuously adjust the displayed content of the application on which the input interface acts on.

More specifically, the input interface may be an interface that can control the displayed content of the application is acts on, such as a sliding bar, a scroll bar, etc. The display area of the input interface in the display screen may be generally set at the side edge or the lower edge of the display screen.

More specifically, the user can perform a sliding operation on the input interface to continuously adjust the displayed content of the application that the input interface acts on. When the user inputs a sliding operation, the user's attention is focused on the displayed content of the application that the input interface acts on. Therefore, the refresh rate of the input interface may be lowered to reduce the power consumption of the electronic device, and thew refresh rate of the display area of the displayed content of the application may be maintained at a higher refresh rate to ensure that the output display effect during the adjustment of the displayed content of the application is consistent.

Figure 4:
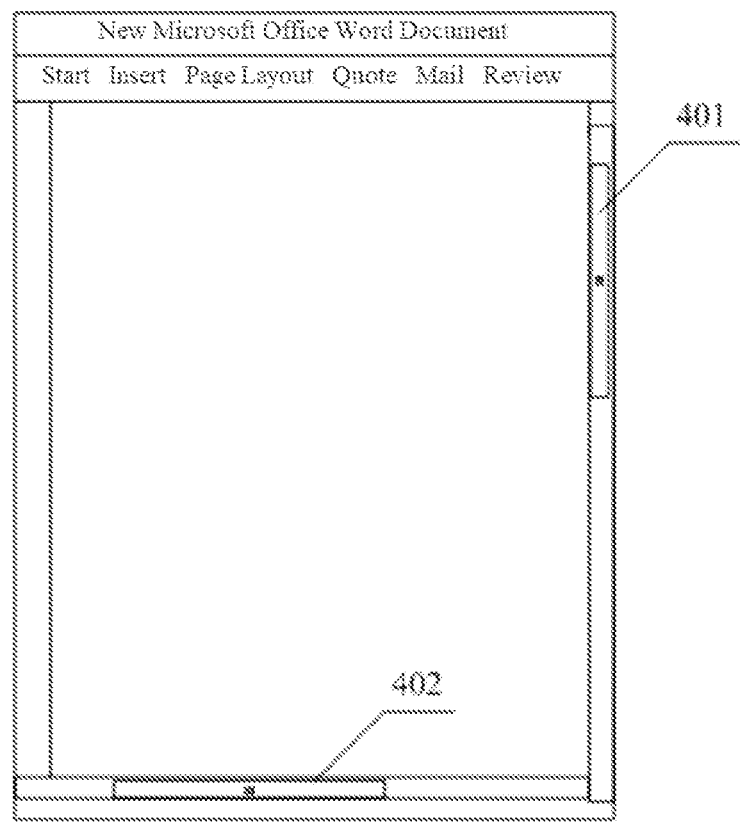
FIG. 4 is a first diagram of a display screen of the information processing method according to an embodiment of the present disclosure.
Figure 4:
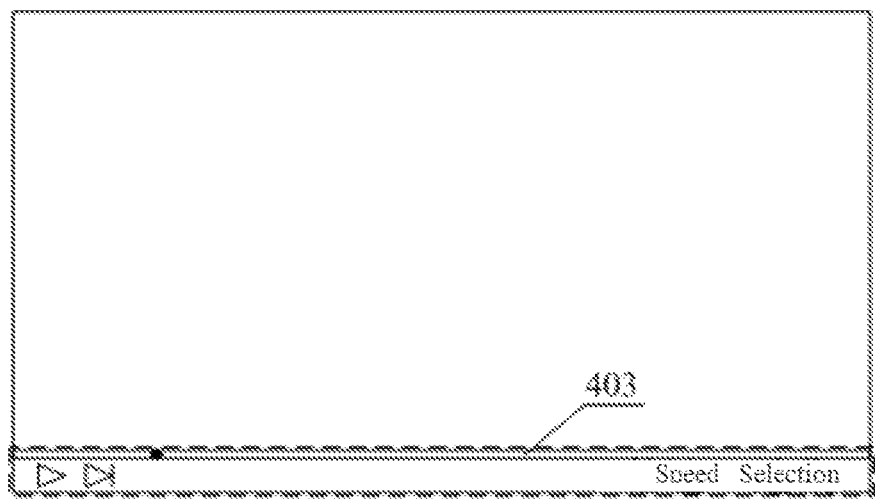

FIG. 4 is a first diagram of a display screen. In (a), a Word interface is being displayed on the display screen, and there are two input interfaces in the Word interface. The two input interfaces (the scroll bars) are being displayed in a right area 401 and a lower area 402 respectively in the Word interface. The scroll bar on the right side is used to control the content in the Word interface to scroll up and down, and the scroll bar on the lower side is used to control the content in the Word interface to scroll left and right. In some embodiments, the refresh rate of the right area 401 and the lower area 402 may be lower than the refresh rate of other areas. In (b), the display screen displays an interface of a video player, the input interface (the scroll bar) is being displayed in a lower area 403 of the video player interface, and the scroll bar can be dragged to control the progress adjustment of the video being played in the player. In some embodiments, the refresh rate of the lower area 403 may be lower than the refresh rate of other areas. For example, the default refresh rate of the display screen may be 120 Hz, the refresh rate of the input interface may be 60 Hz, and the refresh rate of other areas of the display screen may be controlled to maintain at 120 Hz.

In some embodiments, the display area of the input interface may be adjusted based on an attitude change of the electronic device and a control operation change.

Figure 5:
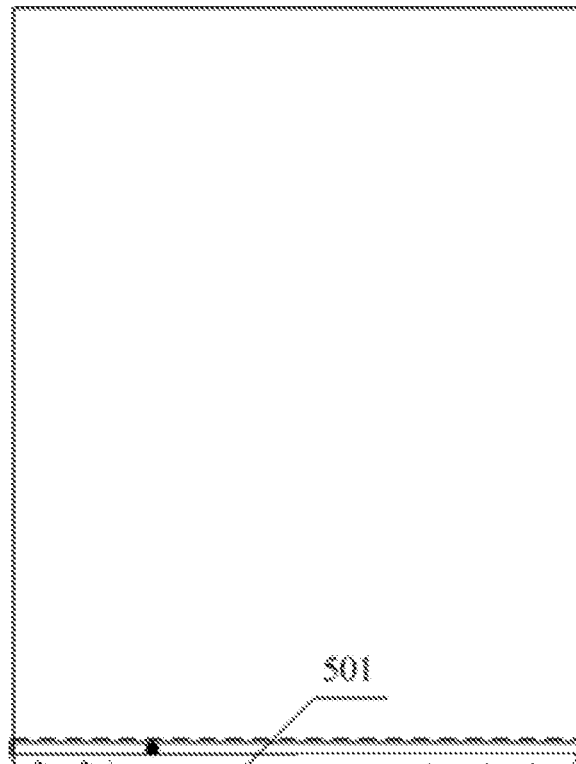
FIG. 5 is a second diagram of the display screen of the information processing method according to an embodiment of the present disclosure
Figure 5:
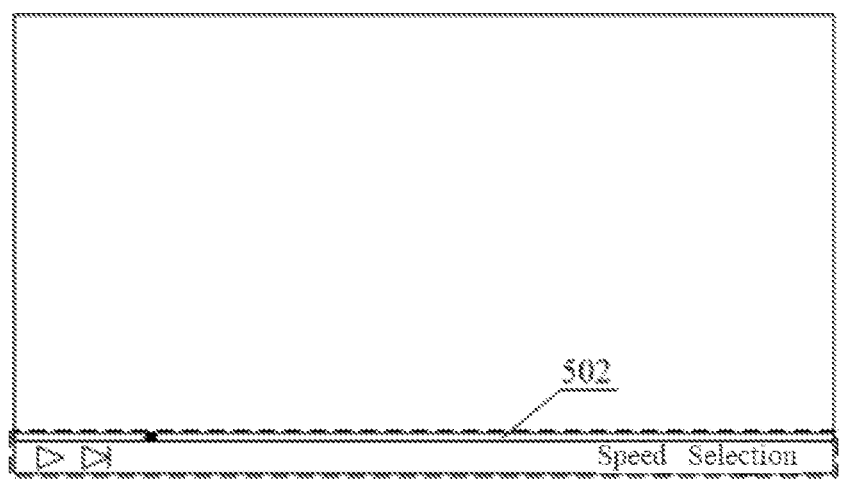

FIG. 5 is a second diagram of a display screen. The video player interface being displayed on the display screen in (a) is a vertical screen interface, the input interface (the scroll bar) is in a lower area 501 of the application interface, and the refresh rate of the display area of the input interface may be lower than the refresh rate of other areas of the display screen. A video player interface being on the display screen in (b) is a horizontal screen interface, the input interface (the scroll bar) is in a lower area 502 of the application interface, and the refresh rate of the display area of the input interface may be lower than the refresh rate of other area of the display screen. In some embodiments, the position changes of the two input interfaces in (a) and (b) of FIG. 5 may be adjusted based on the horizontal and vertical screen change of the electronic device.

Figure 6:
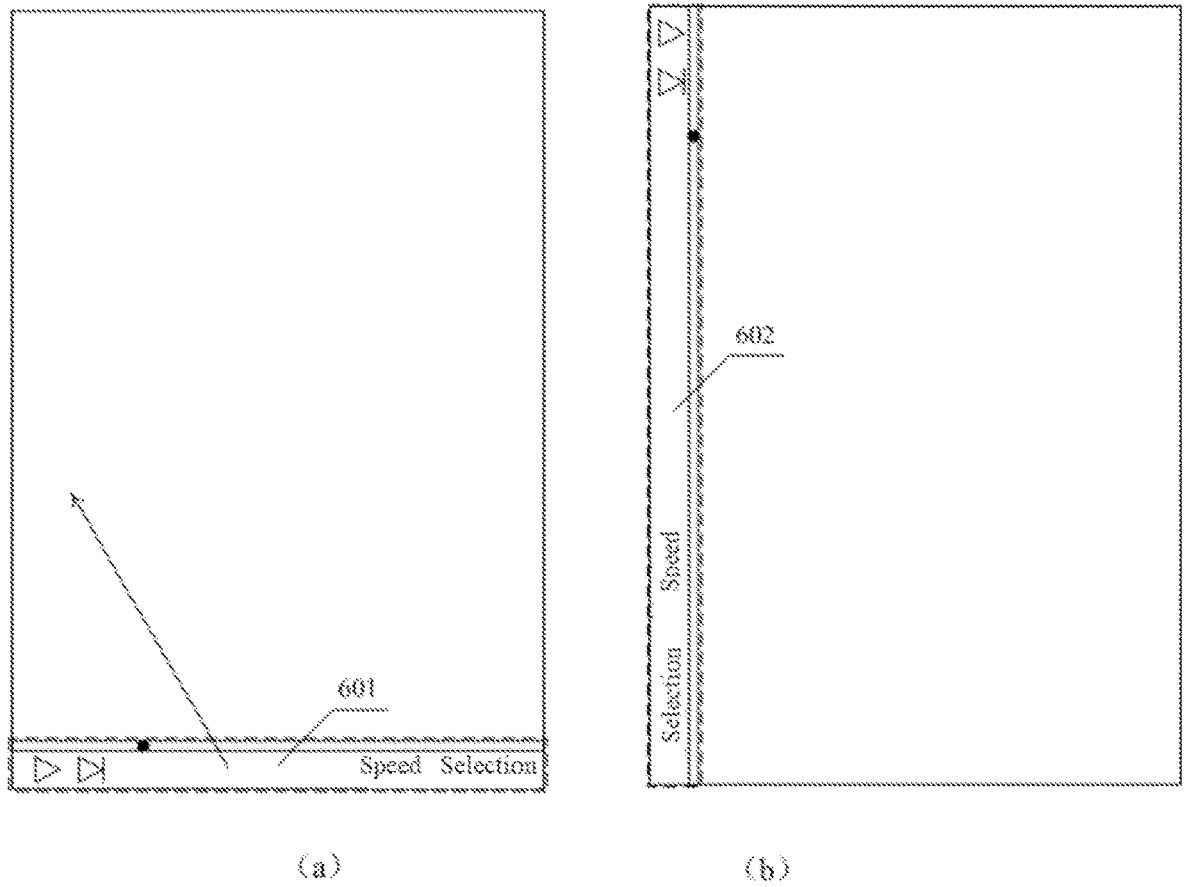
FIG. 6 is a third diagram of the display screen of the information processing method according to an embodiment of the present disclosure

FIG. 6 is a third diagram of a display screen. In the video player interface being displayed on the display screen in (a), the input interface (the scroll bar) is in a lower area 601 of the application interface, and the refresh rate of the display area of the input interface may be lower than the refresh rate of other areas of the display screen. In the video player interface being displayed on the display screen in (b), the input interface (the scroll bar) is in a left area 602 of the application interface, and the refresh rate of the display area of the input interface may be lower than the refresh rate of other areas of the display screen.

In some embodiments, the position change of the two input interfaces in (a) and (b) of FIG. 6 may be controlled based on user gestures, such as dragging the input interface from the lower area 601 to the left area 602 as indicated by the arrow in (a).

304, controlling the output area of the display screen to be adjusted to a refresh rate corresponding to the input interface if the input interface is the second attribute.

In some embodiments, the input interface being the second attribute may indicate that the input interface is being used to obtain a clicking operation to add the displayed content in the application that the input interface acts on.

More specifically, the input interface may be a virtual keyboard, and the display area of the input interface in the display screen may be generally set in the lower half of the display screen. In some embodiments, the display area of the input interface in the display screen may also be set of the left and right sides.

More specifically, the user may click on the display area of the input interface to add displayed content to the application that the input interface acts on. In this process, the user may pay more attention to the content being displayed on the input interface. Since the change in the input interface is limited, the refresh rate of the display area corresponding to the input interface may be slightly lower than the default refresh rate of the display screen. Further, since the user may not pay close attention to the displayed content of the application that the input interface acts on, at this time, the refresh rate of other areas of the display screen may also be reduced, such as adjusting the overall output area of the display screen to the refresh rate corresponding to the input interface, without affecting the user experience, thereby ensuring the user experience while reducing the power consumption of the electronic device.

Figure 7:
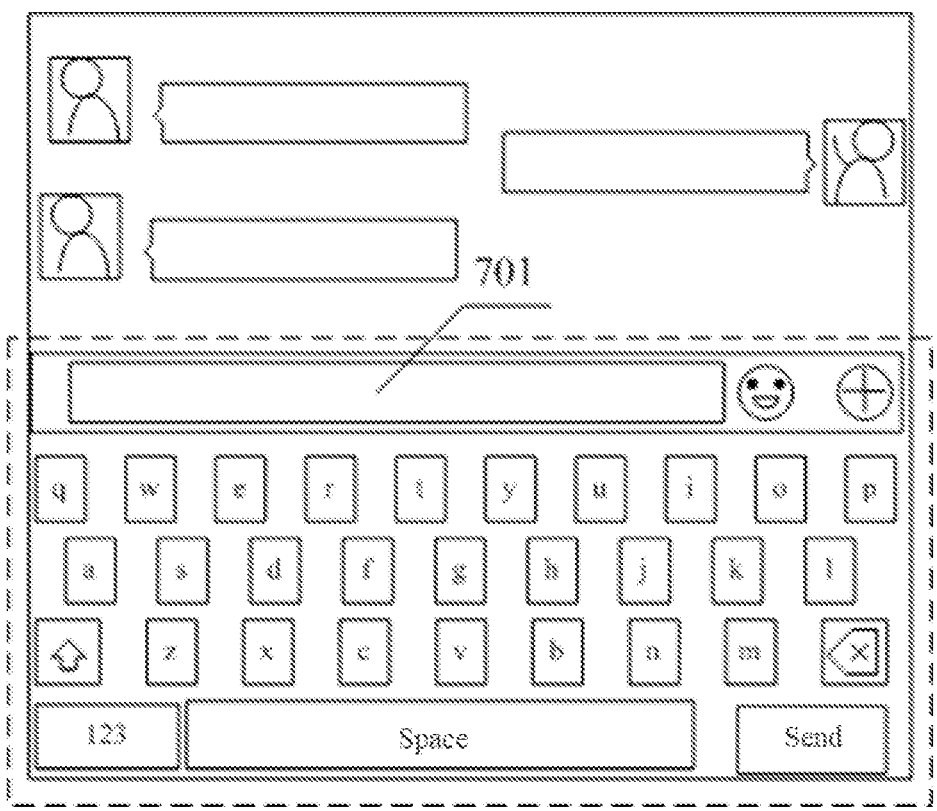
FIG. 7 is a fourth diagram of the display screen of the information processing method according to an embodiment of the present disclosure

FIG. 7 is a fourth diagram of a display screen, and an instant messaging application interface is being displayed on the display screen. The input interface (the virtual keyboard) is being displayed on a lower area 701 in the instant messaging application interface. The default refresh rate of the display screen may be 120 Hz, the refresh rate of the input interface may be 60 Hz, and the refresh rate of other areas in the display screen may also be controlled to be 60 Hz.

Figure 8:
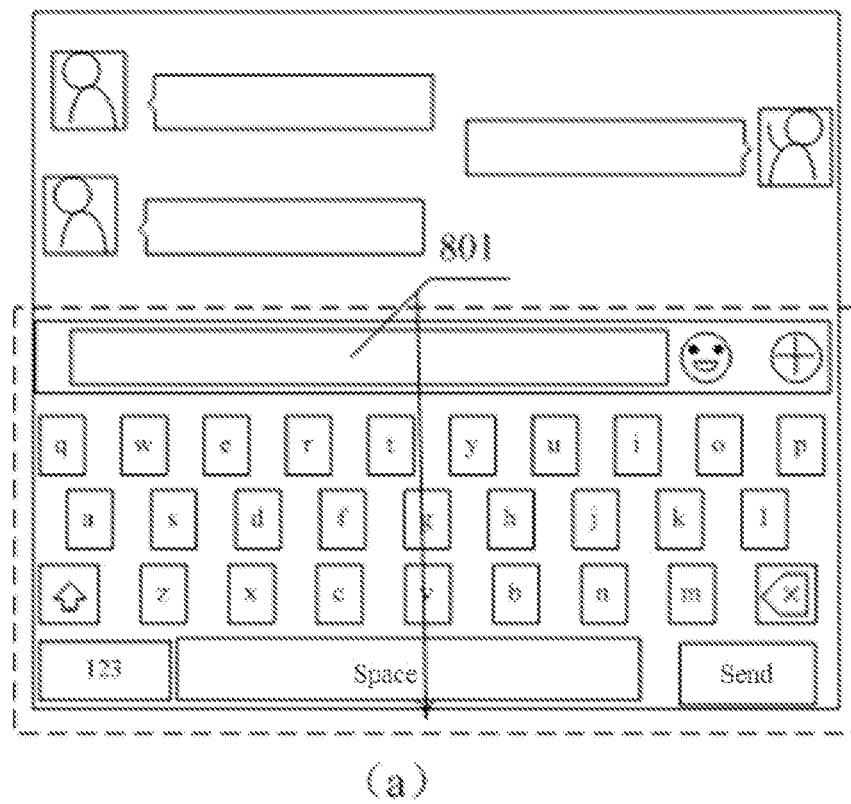
FIG. 8 is a fifth diagram of the display screen of the information processing method according to an embodiment of the present disclosure
Figure 8:
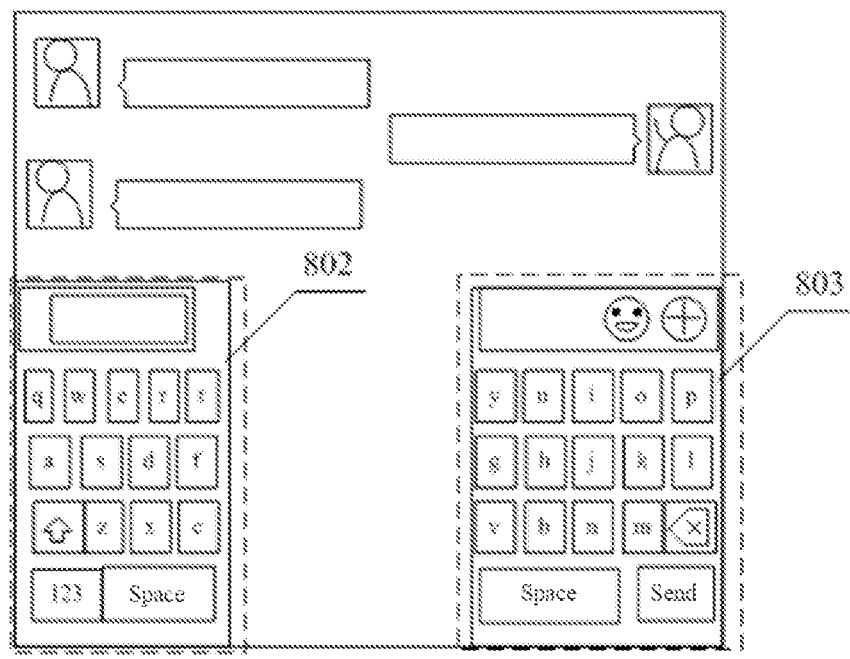

FIG. 8 is a fifth diagram of a display screen, where an instant messaging application interface is being displayed on the display screen in (a). The input interface (the virtual keyboard) is being displayed on a lower area 801 in the instant messaging application interface. In (b), an instant messaging application interface is being displayed on the display screen, and the input interfaces (the virtual keyboards) are being displayed on the lower side of a right area 802 and a left area 803 in the instant messaging application interface. The position change of the two input interfaces in (a) and (b) of FIG. 8 may be based on a specific received gesture performed in the lower area 801, such as a gesture of sliding from top to bottom of the lower area 801, as indicated by the arrow in (a). The default refresh rate of the display screen may be 120 Hz, the refresh rate of the input interface may be 60 Hz, and the refresh rate of other areas of the display screen may also be controlled to be 60 Hz.

In some embodiments, the position of the input interface may also be changed based on the attitude of the electronic device, and adjusted based on the horizontal and vertical screen change of the electronic device.

An embodiment of the present disclosure provides an information processing method where the input interface can be activated and displayed in an output area of a display screen based on a refresh rate corresponding to the input interface. The method includes obtaining the attribute information for characterizing the input interface; controlling the partial area of the output area of the display screen occupied by the input interface to be adjusted to a refresh rate corresponding to the input interface if the input interface is the first attribute; and controlling the output area of the display screen to be adjusted to a refresh rate corresponding to the input interface if the input interface is the second attribute. In this technical solution, the adjustment of the refresh rate of the output area of the display screen occupied by the input interface can be controlled. For input interfaces with different attributes, except for some areas of the display screen corresponding to the input interface, other output areas may use different methods to control the refresh rate, which can reduce the power consumption of the electronic device as much as possible while ensuring the user experience.

Figure 9:
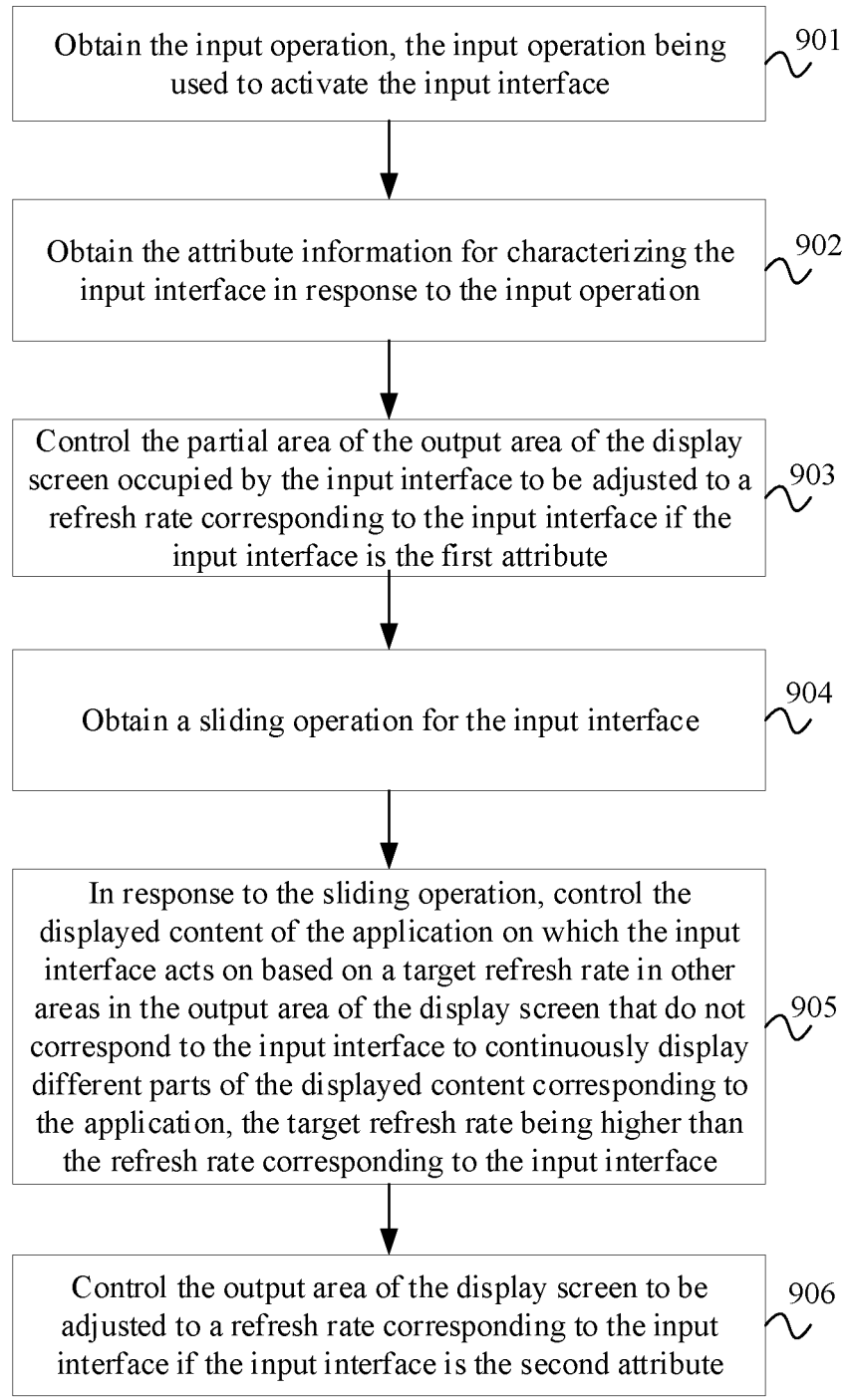
FIG. 9 is a flowchart of the information processing method according to an embodiment of the present disclosure.

FIG. 9 is a flowchart of the information processing method according to an embodiment of the present disclosure. The method will be described in detail below.

901, obtaining the input operation, the input operation being used to activate the input interface.

902, obtaining the attribute information for characterizing the input interface in response to the input operation.

903, controlling the partial area of the output area of the display screen occupied by the input interface to be adjusted to a refresh rate corresponding to the input interface if the input interface is the first attribute.

The processes at 901-903 are the same as the processes at 301-303, which will not be repeated here.

904, obtaining a sliding operation for the input interface.

In some embodiments, the sliding operation may be a sliding performed along an operation direction of the input interface in an area where the input interface is positioned.

For example, the input interface may be a scroll bar, and the sliding operation may include sliding left and right or up and down along the direction of the scroll bar.

905, in response to the sliding operation, controlling the displayed content of the application on which the input interface acts on based on a target refresh rate in other areas in the output area of the display screen that do not correspond to the input interface to continuously display different parts of the displayed content corresponding to the application, the target refresh rate being higher than the refresh rate corresponding to the input interface.

In some embodiments, in response to the sliding operation, the sliding operation may change the content of the application corresponding to the input interface being displayed on the display screen based on the direction of the sliding operation.

More specifically, in the display screen, the content of the application corresponding to the input interface may be output in other output areas except the display area of the input interface.

In some embodiments, based on the sliding operation, the displayed content of the application and the corresponding part of the progress of the scroll bar may be controlled to be continuously displayed in the other output areas.

In addition, the display area of the input interface in the display screen may use a lower refresh rate, and the other output areas may use the target refresh rate. The target refresh rate may be higher than the refresh rate of the display area of the input interface, and the target refresh rate may be an initial refresh rate of the display screen.

906, controlling the output area of the display screen to be adjusted to a refresh rate corresponding to the input interface if the input interface is the second attribute.

The process at 906 is the same as the process at 304, which will not be repeated here.

An embodiment of the present disclosure provides an information processing method that, if the input interface is the first attribute, the method includes obtaining a sliding operation for the input interface; and in response to the sliding operation, controlling the displayed content of the application on which the input interface acts on based on a target refresh rate in other areas in the output area of the display screen that do not correspond to the input interface to continuously display different parts of the displayed content corresponding to the application, the target refresh rate being higher than the refresh rate corresponding to the input interface. In this technical solution, based on the sliding operation on the input interface, the displayed content of the application corresponding to the input interface in the display screen can be controlled, and the refresh rate of the area displaying the displayed content of the application can use the target refresh rate, and the display area of the input interface can use a refresh rate that is lower than the target refresh rate. The refresh rate of the input interface can be relatively low to reduce the power consumption of the electronic device, and the refresh rate of the display area of the displayed content of the application can be maintained at a relatively high refresh rate to ensure the output display effect of the application's displayed content adjustment process is consistent.

Figure 10:
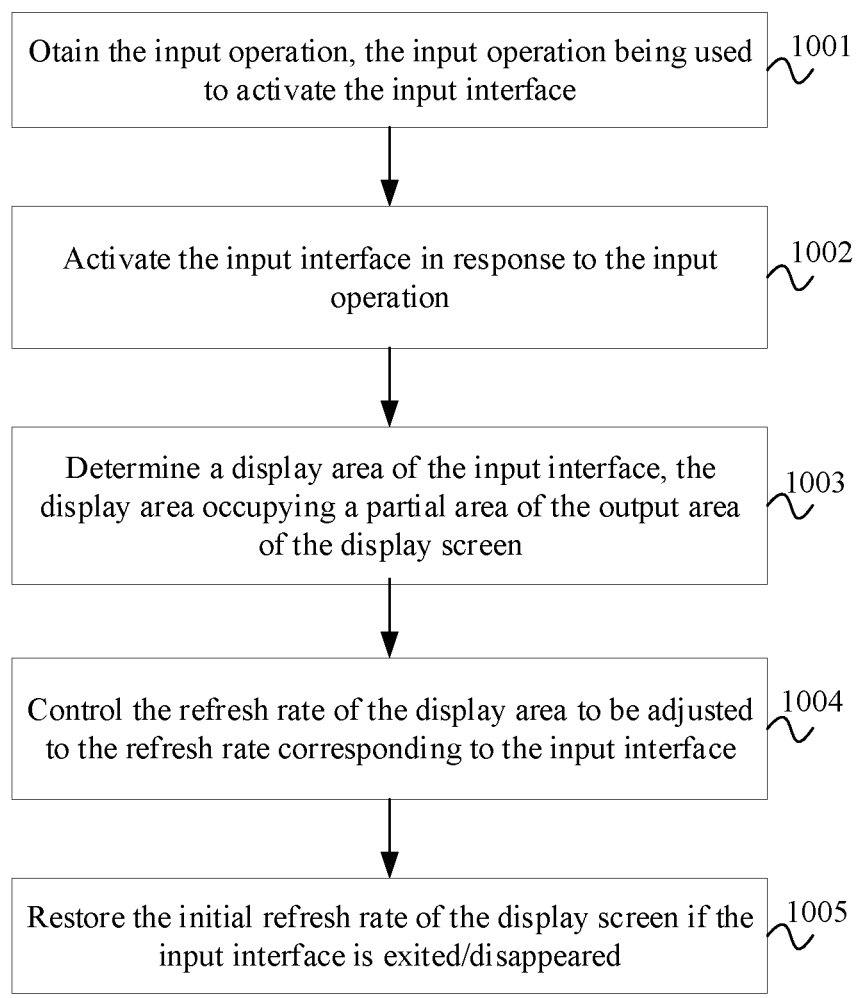
FIG. 10 is a flowchart of the information processing method according to an embodiment of the present disclosure.

FIG. 10 is a flowchart of the information processing method according to an embodiment of the present disclosure. The method will be described in detail below.

1001, obtaining the input operation, the input operation being used to activate the input interface.

1002, activating the input interface in response to the input operation.

1003, determining a display area of the input interface, the display area occupying a partial area of the output area of the display screen.

1004, controlling the refresh rate of the display area to be adjusted to the refresh rate corresponding to the input interface.

The processes at 1001-1004 are the same as the processes at 201-203, which will not be repeated here.

1005, restoring the initial refresh rate of the display screen if the input interface is exited/disappears.

In some embodiments, if the input interface is exited/disappears, the user may not provide input based on the input interface, and the user's attention may return to the displayed content on the display screen. Therefore, the initial refresh rate of the display screen can be restored to maintain the consistency of the output display effect of the display screen and ensure the user's viewing experience.

In some embodiments, the input interface may exit/disappear when one of the following situations occur: the user performs other input operations to exit the input interface, the display time of the input interface reaches a preset time, and the input interface does not receive an input operation within a preset period of time. Further, it should be noted that the exit/disappear situations are not limited to the foregoing examples.

When the input interface is the first attribute, the refresh rate of the display area corresponding to the input interface may be lower than the refresh rate of other areas in the display screen. When the input interface is exited/disappears, the refresh rate of the display area of the input interface in the display screen may be increased to keep the refresh rate consistent with the refresh rate of other areas in the display screen.

For example, when the input interface is the second attribute, the overall refresh rate of the display screen may be lower than the initial refresh rate, and when the input interface is exited/disappears, the overall refresh rate of the display screen may be increased to the initial refresh rate.

An embodiment of the present disclosure provides an information processing method that, when the input interface is exited/disappears, the initial refresh rate of the display screen can be restored, such that the overall refresh rate of the display screen can return to the initial refresh rate, thereby maintaining the continuity of the output display effect of the display screen and ensure the user's viewing experience.

Corresponding to the foregoing embodiments of the information processing method, an embodiment of the present disclosure further provides an electronic device to implement the information processing method.

Figure 11:
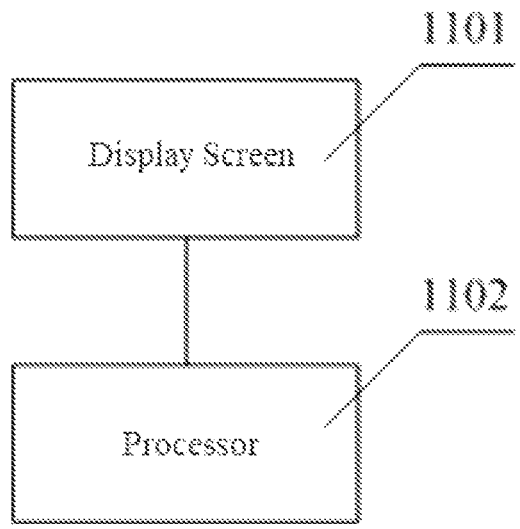
FIG. 11 is a schematic structural diagram of an electronic device according to an embodiment of the present disclosure.

FIG. 11 is a schematic structural diagram of an electronic device according to an embodiment of the present disclosure. As shown in FIG. 11, the electronic device includes a display screen 1101 and a processor 1102.

The processor may be configured to obtain an input operation, the input operation being used to activate an input interface; and activate the input interface and display the input interface in an output area of the display screen based on a refresh rate corresponding to the input interface in response to the input operation.

Figure 12:
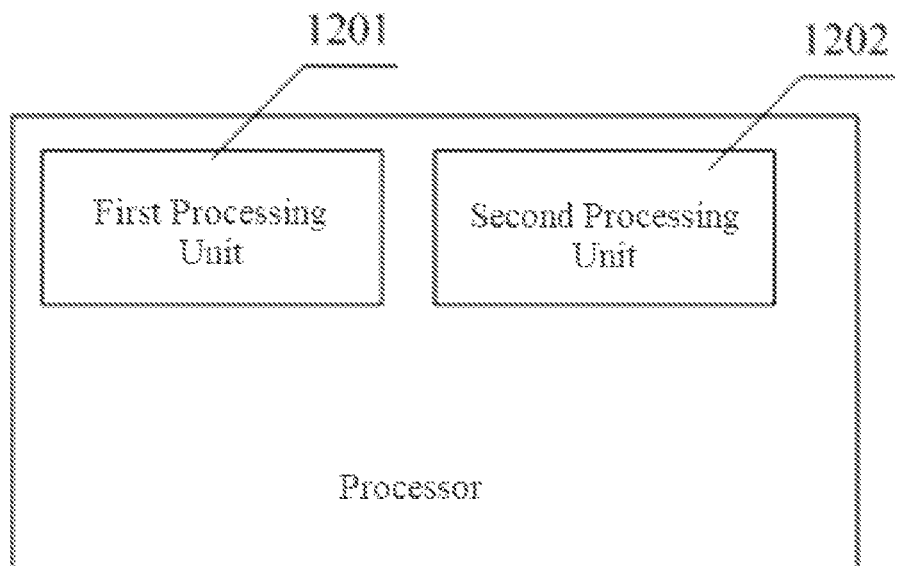
FIG. 12 is a schematic structural diagram of a processor of the electronic device according to an embodiment of the present disclosure.

FIG. 12 is a schematic structural diagram of a processor of the electronic device according to an embodiment of the present disclosure. As shown in FIG. 12, the processor includes at least one first processing unit 1201 and at least one second processing unit 1202.

In some embodiments, the first processing unit may be configured to control the refresh rate of the output area of the input interface in the display screen to a first refresh rate, and the second processing unit may be configured to control the refresh rate of the output area of the input interface in the display screen to a second refresh rate, where the second refresh rate may be the same as or different from the first refresh rate.

In some embodiments, the number of the first processing units may correspond to the output area of the input interface in the display screen.

In some embodiments, a first processing unit may control the output area of the input interface.

In some embodiments, when there are multiple first processing units, the number of first processing units may correspond to the number of output areas of the input interface. Each output area may correspond to a first processing unit, or each output area may be determined based on the area of the output area, and a first processing unit may correspond to an output area of a specific area and a fixed position.

It should be noted that in some embodiments, the first processing unit may control the output area at a fixed position in the display screen, and display the input interface in the output area corresponding to the first processing unit.

In some embodiments, the number of second processing unit may correspond to the output area other than the input interface in the display screen.

In some embodiments, a second processing unit may be used to control the output areas other than the input interface.

In some embodiments, when there are multiple second processing units, the number of second processing units may correspond to the number of output areas other than the input interface. Each area may correspond to a second processing unit, or each area may be determined based on the area of the output area, and a second processing unit may correspond to an area of a specific area and a fixed position.

It should be noted that in some embodiments, the second processing unit may control an area at a fixed position in the display screen, and display output content other than the input interface in the area corresponding to the second processing unit.

Figure 13:
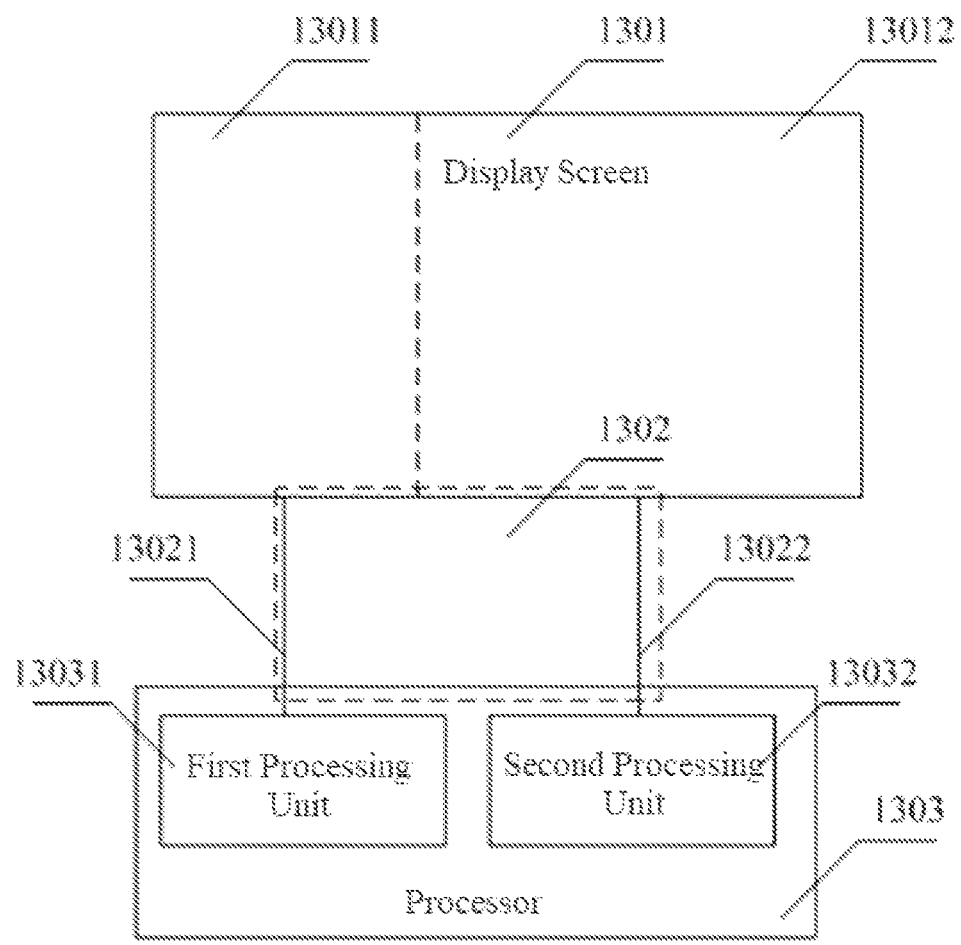
FIG. 13 is another schematic structural diagram of the electronic device according to an embodiment of the present disclosure.

FIG. 13 is another schematic structural diagram of the electronic device according to an embodiment of the present disclosure. As shown in FIG. 13, the electronic device includes a display screen 1301, a drive line assembly 1302, and a processor 1301.

In some embodiments, the drive line assembly may be used to connect the display screen and the processor.

In some embodiments, at least one drive line 13021 may be used to connect an output area 13011 of the input interface in the display screen and at least one first processing unit 13031, and at least one second drive line 13022 may be used to connect an area 13012 of the display screen other than the output area of the input interface and at least one second processing unit 13032.

In some embodiments, the number of the first driving lines may correspond to the number of the structures at both ends (the output area of the input interface and the first processing unit) to which it is connected In some embodiments, the number of the second driving lines may correspond to the number of the structures at both ends (the area other than the output area of the input interface in the display screen, and the second processing unit) to which it is connected.

As shown in FIG. 13, there is one first processing unit and one output area of the input interface in the display screen area that are connected by a first drive line, and the second processing unit and the area other than the output area of the input interface includes three areas. The output area of the input interface in the display screen may use a refresh rate of 60 Hz, and the area other than the output area of the input interface in the display screen may use a refresh rate of 120 Hz.

In some embodiments, the processor may be configured to determine a display area of the input interface, the display area occupying a partial area of the output area of the display screen; and control the refresh rate of the display area to be adjusted to the refresh rate corresponding to the input interface.

In some embodiments, the processor may be configured to obtain the attribute information for characterizing the input interface; control the partial area of the output area of the display screen occupied by the input interface to be adjusted to a refresh rate corresponding to the input interface if the input interface is the first attribute; and control the output area of the display screen to be adjusted to a refresh rate corresponding to the input interface if the input interface is the second attribute.

In some embodiments, the input interface being the first attribute may indicate that the input interface is being used to obtain a sliding operation to continuously adjust the displayed content of the application on which the input interface acts on. In some embodiments, the input interface being the second attribute may indicate that the input interface is being used to obtain a clicking operation to add the displayed content in the application that the input interface acts on.

In some embodiments, if the input interface is the first attribute, the processor may be further configured to obtain a sliding operation for the input interface; and in response to the sliding operation, control the displayed content of the application on which the input interface acts on based on a target refresh rate in other areas in the output area of the display screen that do not correspond to the input interface to continuously display different parts of the displayed content corresponding to the application, the target refresh rate being higher than the refresh rate corresponding to the input interface.

It should be noted that for the functional explanation of each component of the electronic device, reference can be made to the foregoing information processing method embodiments, which will not be repeated here.

Consistent with the present disclosure, the electronic device includes a display screen and a processor. The processor can be configured to obtain an input operation, the input operation being used to activate an input interface; and activate the input interface and display the input interface in an output area of the display screen based on a refresh rate corresponding to the input interface in response to the input operation. In this technical solution, after the input interface is activated, the input interface can be displayed at a different refresh rate from other areas in the display screen, such that different areas of the display screen can use different refresh rates. Compared with using the same refresh rate for the entire surface, the refresh power consumption of the screen is reduced.

Corresponding to the foregoing information processing method embodiments, an embodiment of the present disclosure further provides a readable storage medium corresponding to the information processing method.

The readable storage medium may include a computer program stored thereon, and the computer program may be executed by a processor to implement the processes of the information processing method described above.

More specifically, the computer program stored in the readable storage medium may be executed to control information processing. For details, reference can be made to the foregoing method embodiments.

The embodiments of the disclosure are described in a progressive manner, each embodiment focuses on a difference from other embodiments, and for a same or similar part, the embodiments may refer to each other. For the electronic device according to the embodiments, it corresponds to the method according to the embodiments, thus description is brief, and for relevance, the method part may be referred to.

The above description of the embodiments of the disclosure is to enable those skilled in the art to implement or use the disclosure. Various modifications made to the embodiments are apparent to those skilled in the art, and the general principles defined in the disclosure may be implemented in other embodiments without departing from the spirit and scope of the disclosure. Hence, the disclosure is not limited to the embodiments described in the disclosure, but conforms to a widest scope consistent with the principles and novel features in the disclosure.

What is claimed is:

1. An information processing method comprising:
obtaining an input operation, the input operation being used to activate an input interface; and
activating the input interface and displaying the input interface in an output area of a display screen based on a refresh rate corresponding to the input interface in response to the input operation, including:
controlling part of the output area of the display screen occupied by the input interface to adjust to the refresh rate corresponding to the input interface in response to the input interface being used to obtain a sliding operation to continuously adjust displayed content of an application on which the input interface acts on; and
controlling the output area of the display screen to adjust to the refresh rate corresponding to the input interface in response to the input interface being used to obtain a clicking operation to add displayed content in the application on which the input interface acts on.

2. The method of claim 1, wherein displaying the input interface in the output area of the display screen based on the refresh rate corresponding to the input interface includes:
determining a display area of the input interface, the display area occupying a part of the output area of the display screen; and
controlling the refresh rate of the display area to be adjusted to the refresh rate corresponding to the input interface.

3. The method of claim 2, further comprising:
restoring an initial refresh rate of the display screen in response to the input interface being exited or having disappeared.

4. The method of claim 1, after controlling the part of the output area of the display screen occupied by the input interface to adjust to the refresh rate corresponding to the input interface in response to the input interface being used to obtain the sliding operation to continuously adjust the displayed content of the application on which the input interface acts on, further comprising:
obtaining the sliding operation for the input interface; and
in response to the sliding operation, controlling the displayed content of the application on which the input interface acts on based on a target refresh rate in other areas in the output area of the display screen that do not correspond to the input interface to continuously display different parts of the displayed content corresponding to the application, the target refresh rate being higher than the refresh rate corresponding to the input interface.

5. An electronic device comprising:
a display screen;
a processor, the processor being configured to:
obtain an input operation, the input operation being used to activate an input interface; and
activate the input interface and display the input interface in an output area of the display screen based on a refresh rate corresponding to the input interface in response to the input operation, including:
controlling part of the output area of the display screen occupied by the input interface to adjust to the refresh rate corresponding to the input interface in response to the input interface being used to obtain a sliding operation to continuously adjust displayed content of an application on which the input interface acts on; and
controlling the output area of the display screen to adjust to the refresh rate corresponding to the input interface in response to the input interface being used to obtain a clicking operation to add displayed content in the application on which the input interface acts on.

6. The electronic device of claim 5, wherein the processor includes:
one or more first processing units configured to control the refresh rate of the output area of the input interface in the display screen to a first refresh rate; and
one or more second processing units configured to control the refresh rate of the output area of the input interface in the display screen to a second refresh rate, the second refresh rate being the same as or different from the first refresh rate.

7. The electronic device of claim 6, further comprising:
a drive line assembly for connecting the display screen and the processor, wherein:
one or more first drive lines are being used to connect the output area of the input interface in the display screen and the one or more first processing unit; and
one or more second drive lines are being used to connect an area of the display screen other than the output area of the input interface and the one or more second processing units.

8. The electronic device of claim 5, wherein the processor is further configured to:
determine a display area of the input interface, the display area occupying a part of the output area of the display screen; and
control the refresh rate of the display area to be adjusted to the refresh rate corresponding to the input interface.

9. The electronic device of claim 8, wherein the processor is further configured to:
restore an initial refresh rate of the display screen in response to the input interface being exited or having disappeared.

10. The electronic device of claim 5, wherein in response to the input interface being used to obtain the sliding operation to continuously adjust the displayed content of the application on which the input interface acts on, the processor is further configured to:
obtain the sliding operation for the input interface; and
in response to the sliding operation, control the displayed content of the application on which the input interface acts on based on a target refresh rate in other areas in the output area of the display screen that do not correspond to the input interface to continuously display different parts of the displayed content corresponding to the application, the target refresh rate being higher than the refresh rate corresponding to the input interface.

11. A non-transitory computer-readable storage medium containing computer-executable instructions for, when executed by one or more processors, performing an information processing method, the method comprising:
obtaining an input operation, the input operation being used to activate an input interface; and
activating the input interface and displaying the input interface in an output area of a display screen based on a refresh rate corresponding to the input interface in response to the input operation, including:
controlling part of the output area of the display screen occupied by the input interface to adjust to the refresh rate corresponding to the input interface in response to the input interface being used to obtain a sliding operation to continuously adjust displayed content of an application on which the input interface acts on; and
controlling the output area of the display screen to adjust to the refresh rate corresponding to the input interface in response to the input interface being used to obtain a clicking operation to add displayed content in the application on which the input interface acts on.

12. The non-transitory computer-readable storage medium of claim 11, wherein displaying the input interface in the output area of the display screen based on the refresh rate corresponding to the input interface includes:
determining a display area of the input interface, the display area occupying a part of the output area of the display screen; and
controlling the refresh rate of the display area to be adjusted to the refresh rate corresponding to the input interface.

13. The non-transitory computer-readable storage medium of claim 12, the method further comprising:
restoring an initial refresh rate of the display screen in response to the input interface being exited or having disappeared.

14. The non-transitory computer-readable storage medium of claim 11, after controlling the part of the output area of the display screen occupied by the input interface to adjust to the refresh rate corresponding to the input interface in response to the input interface being used to obtain the sliding operation to continuously adjust the displayed content of the application on which the input interface acts on, further comprising:
obtaining the sliding operation for the input interface; and
in response to the sliding operation, controlling the displayed content of the application on which the input interface acts on based on a target refresh rate in other areas in the output area of the display screen that do not correspond to the input interface to continuously display different parts of the displayed content corresponding to the application, the target refresh rate being higher than the refresh rate corresponding to the input interface.

* * * * *